Dec. 18, 1956  D. BERLIN  2,774,411
AUXILIARY AUTOMOBILE SEAT
Filed March 29, 1954  3 Sheets-Sheet 1
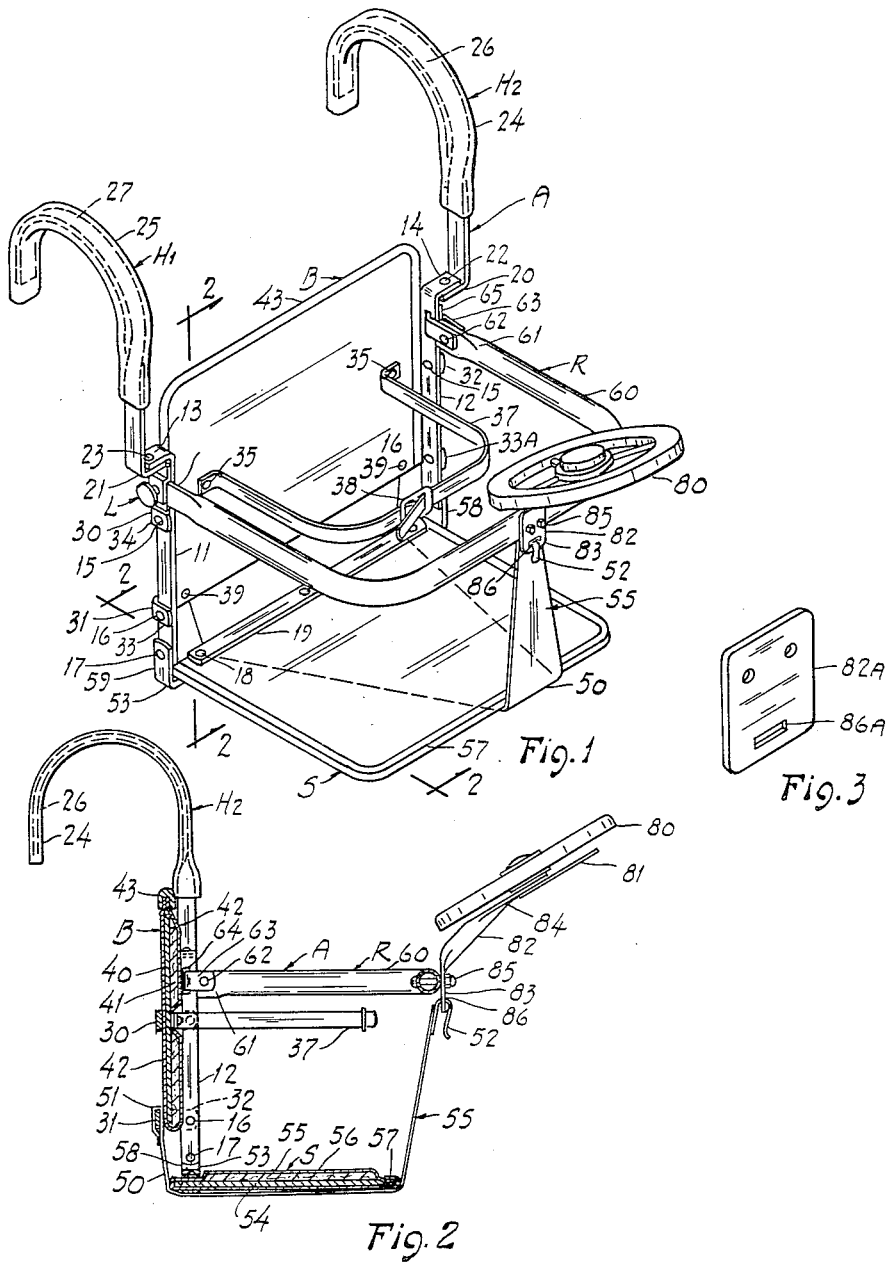
INVENTOR.
Dennis Berlin
BY Harry Sangsam
Attorney Dec. 18, 1956 D. BERLIN 2,774,411
AUXILIARY AUTOMOBILE SEAT
Filed March 29, 1954 3 Sheets-Sheet 2
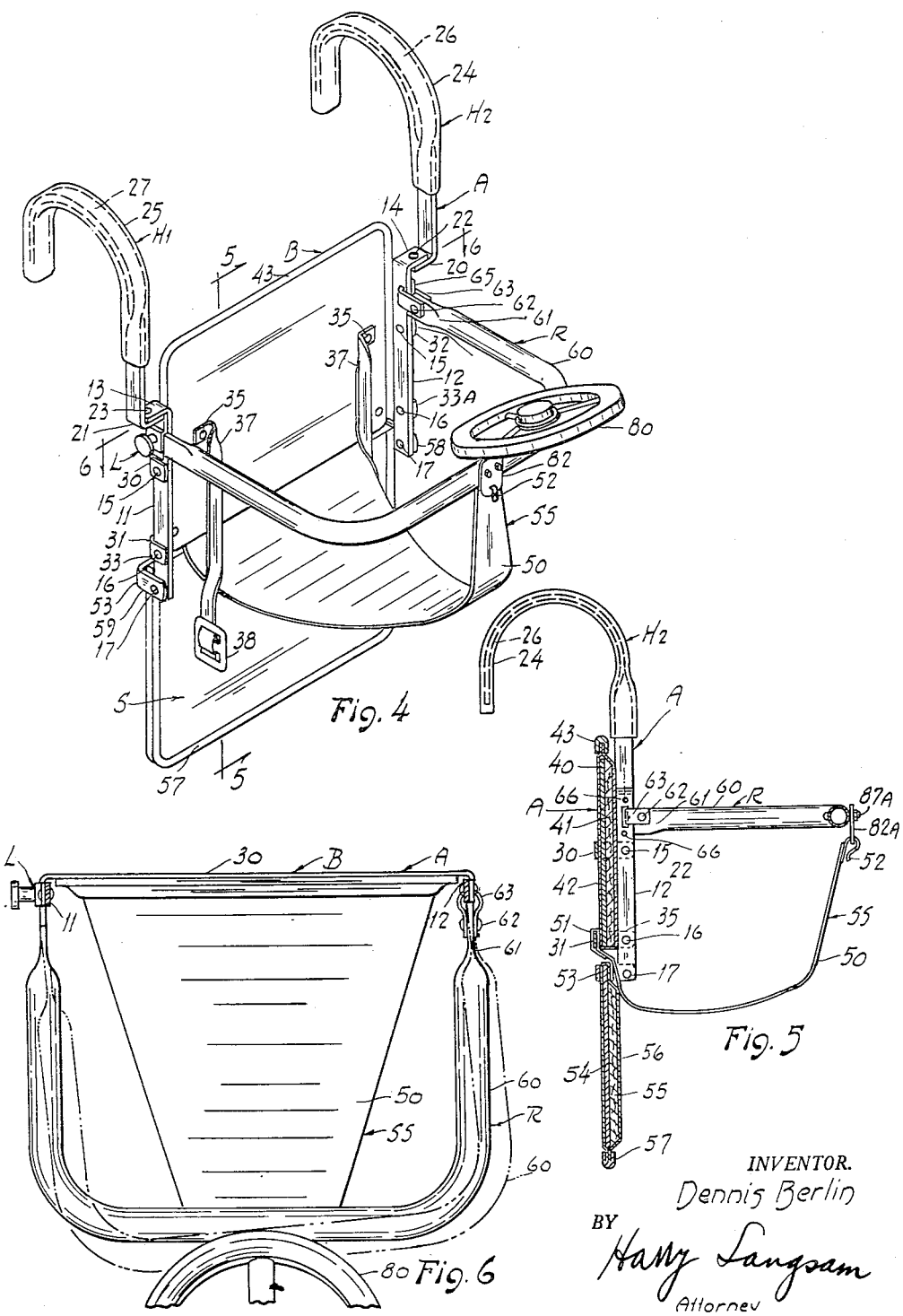
INVENTOR.
Dennis Berlin
BY
Harry Langsam
Attorney Dec. 18, 1956 D. BERLIN 2,774,411
AUXILIARY AUTOMOBILE SEAT
Filed March 29, 1954 3 Sheets-Sheet 3

INVENTOR.
Dennis Berlin
BY Harry Langsam
Attorney

United States Patent Office 2,774,411
Patented Dec. 18, 1956

2,774,411

AUXILIARY AUTOMOBILE SEAT

Dennis Berlin, Philadelphia, Pa.

Application March 29, 1954, Serial No. 419,363

3 Claims. (Cl. 155—79)

My invention relates to auxiliary seats and more particularly to seats for small children; the seat being collapsible and adapted to be supported by the back of a larger chair or the back of an automobile seat.

My improved auxiliary seat is adapted to support and secure small children from the time that they are just able to sit upright until they are three or four years old; it is also adapted to restrain the child in a sitting or standing position and to provide fairly substantial support for the child, should the child elect to sit down when the seat portion is in the lowered position.

It is, therefore, an object of my invention to construct an auxiliary seat that will support and restrain a child in a seated or standing position.

Another object of my invention is to construct an auxiliary seat with securing means to prevent very small children from unrestrained lateral movement when seated and limit the downward movement of the child when the auxiliary seat is arranged to restrain the child when the child is standing.

Another object of my invention is to construct an auxiliary seat that presents a fairly flat surface to the back of the chair or automobile seat to which it is attached thereby preventing excessive spot wear to the covering of the supporting chair or seat.

Another object of my invention is to construct an auxiliary seat fitted with an amusement device for the entertainment of the child using the seat.

Another object of my invention is to construct an auxiliary seat arranged to permit easy placing or removing of the child into or out of the seat.

Another object of my invention is to construct an auxiliary seat that is readily folded into a compact arrangement for storage in the home or automobile.

Other objects of my invention are to construct an improved device of the character described, which is easily and economically produced and which is sturdy in construction and compact in its folded form.

Other objects, novel features and advantages of arrangement, construction and design comprehended by the invention are hereafter more fully disclosed in the description of a preferred embodiment as illustrated in the accompanying drawings, wherein like reference characters denote corresponding parts throughout.

Fig. 1 is an isometric view of an auxiliary seat embodying the features of my invention.

Fig. 2 is a sectional view of the auxiliary seat shown in Fig. 1 taken along line 2—2—2—2.

Fig. 3 is an alternate seat strap securing means as will hereinafter be described.

Fig. 4 is an isometric view of the auxiliary seat, showing the seat portion lowered and the auxiliary seat arranged to restrain the child in a standing or seated position.

Fig. 5 is a sectional view of the auxiliary seat taken along line 5—5 of Fig. 4.

Fig. 6 is a plan view of the auxiliary seat taken along line 6—6 of Fig. 4.

Referring in greater detail to the illustrations, I disclose an auxiliary seat, arranged to support and restrain a child in either a seated or standing position. The auxiliary seat, generally designated A, is comprised of a seat, generally designated S, a back rest, generally designated B, a restraining bar, generally designated R, a support strap, generally designated S—S, and attachment hooks, generally designated H1 and H2.

Figure 7:
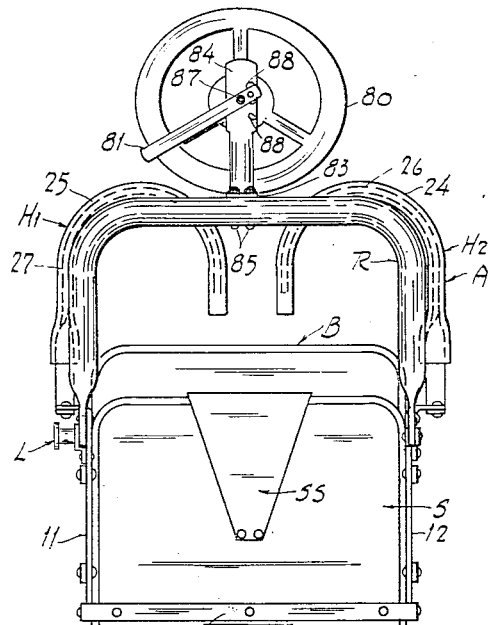
Fig. 7 is an elevational view of the auxiliary seat showing the seat in the folded arrangement.

The seat frame is comprised of metal straps. The back supporting members 11 and 12 are identical in construction. Their upper ends 13—14 extend outward to engage the horizontally extending lower ends 20—21 of the attachment hooks H1 and H2. Vertical pivotal connection 23 is provided between the back supporting member 11 and the horizontally extending portion 21 of the attachment hook H1 and a similar vertical pivotal connection 22 is provided between the back supporting member 12 and the horizontally extending portion 20 of the attachment hook H2. This arrangement permits the attachment hooks H1 and H2 to be rotated so that they can adjust to the back of the supporting seat or chair and also so that they can be arranged in parallel positioning when the auxiliary seat A is folded for storage as illustrated in Fig. 7. Rubber or rubber-like sleeves 24 and 25 are forced over the hook ends 26 and 27 of the attachment hooks H1 and H2. The purpose of the sleeves 24 and 25 is to prevent marring of the supporting seat or chair back when the auxiliary seat is being supported by said seat or chair back.

The auxiliary seat back member B is comprised of a slab of plywood or pressed wood 40. Attached to the front side of the back slab 40 is padding material 41 and over the combination is formed a covering of decorative material 42 bound on its upper and side edges by a binding 43.

The auxiliary seat back member B is secured and retained in spaced relationship to the back frame members 11 and 12 by an upper cross member 30 and a lower cross member 31. The upper cross member 30 has right angularly extending ends 32 and 34 arranged to interfit with the back frame members 11 and 12 to which they are fixedly attached by rivets 15.

The back member B is fixedly secured to the upper cross member 30 by rivets 35. The rivets 35 serve the dual purpose of securing the back B to the cross member 30 and to secure the ends of a safety strap 37. The safety strap 37 is provided for the securing of a very young child; one that is just able to sit up; the safety strap is provided with a buckle type securing means 38. The auxiliary seat back member B is retained at the bottom in definite spaced relationship to the back frame members 11 and 12 by a lower cross member 31. The lower cross member 31 has right angularly extending ends 33 and 33a arranged to interfit with the back frame members 11 and 12 and to which they are fixedly attached by rivets 16. The back member B of the auxiliary seat is secured to the cross member 31 by rivets 39.

In addition to securing the bottom of the auxiliary seat back member B, the lower cross member 31 also secures and supports the back end of a seat support strap 50. The seat support strap 50 is fabricated of a flexible material and a fold or loop 51 is formed on the back end, said loop 51 being over the cross member 31. The front end of the seat support strap 50 is fitted with a spring hook securing means 52 arranged to interfit with a seat strap keeper 86 hereinafter described. The seat strap 50 serves a dual purpose in that it supports the seat S when the auxiliary seat is arranged for seating the child therein, it also extends upward in front of the seat and between the legs of the child, see Fig. 1, thus preventing the child sliding down and out of the seat. When the auxiliary seat is arranged to permit the child to stand and still be fairly secure the seat strap is arranged as in Figs. 4 and 5 with the seat strap extending between the legs of the child and secured to the seat strap securing means 86. With the seat strap arranged in this manner, the child has the advantage of being free to stand and it can also use the seat strap as a form of seat should it elect to do so; the seat strap preventing the child from sliding down and out of the protection of the restraining bar R.

The seat member S of the auxiliary seat is pivotally attached to and retained in movable spaced relationship to the back frame members 11 and 12 by the seat support member 53. The seat member S is comprised of a ply-wood or pressed wood slab 54. Secured to the upper surface of the slab 54 is padding material 55 and over the combination is formed a covering of decorative material 56 bound on its front and side edges with a binding 57. The seat support member 53 has right angularly extending ends 58 and 59 arranged to interfit with and be pivotally secured to the lower ends of the back frame members 11 and 12 by the rivets 17. The auxiliary seat, seat member S is secured to the seat support strap 50 by the rivets 18 and clamping strap 19.

Figure 8:
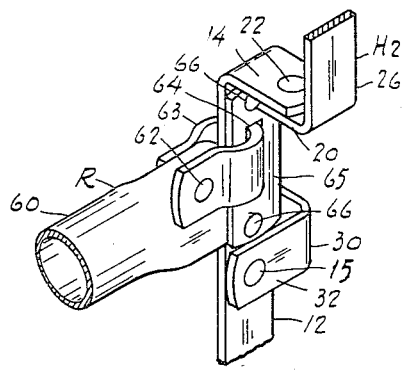
Fig. 8 is a fragmental sectional isometric view of the hinged end of the auxiliary seat restraining bar.

The auxiliary seat S, restraining bar R is arranged to be pivotally attached to swing vertically and horizontally, to the right hand back frame member 12 and detachably secured to the left hand back frame member 11. With this arrangement, when it is desired to place a child into, or remove a child from the auxiliary seat, it is possible to detach the restraining bar from the left hand back frame member 11 and rotate the restraining bar on the right hand back frame member 12 as illustrated in Fig. 6. This arrangement makes it unnecessary to lift the child up and over the bar, a difficult maneuver in present day cars with their low ceilings. The auxiliary seat restraining bar is comprised of tubular metal formed into a U-shape 60; the right hand end 61 of the restraining bar is flattened and pierced with a hole to receive a rivet 62 that pivotally secures the restraining bar to a looped metal strap 63. The looped metal strap 63 interfits with a rectangular hole 64 in the back frame member 12 and is free to move in this hole 64 to permit horizontal movement of the restraining bar. The back frame member 12 is reinforced adjacent to the rectangular hole 64 by a metal plate 65 having a corresponding rectangular hole. The plate 65 is fixedly attached to the back frame member 12 by the rivets 66—66, see Fig. 8. The flattened end 61 of the restraining bar R extends downward from the securing means 63 and the end of the flattened portion bears on the edges of the back frame member 12 and reinforcing plate 15 and thereby prevents downward motion of the restraining bar R. The left hand end 67 of the restraining bar R is flattened and formed to interfit with a detachable securing means; the upper portion 68 of the flattened end 67 is arranged to extend into the locking means, generally designated L, and is pierced with a hole 69 that is positioned to receive the bolt of the locking device. A notched lower portion 70 of the flattened end 67 is arranged to rest on the edge of the locking device means when the restraining bar is locked in position which thereby prevents downward movement of the restraining bar R. When it is desired to fold the auxiliary seat A for storage, the restraining bar R is detached from the locking means L and rotated upward on the pivot rivet 62 to a position for storage as illustrated in Fig. 7.

Figure 10:
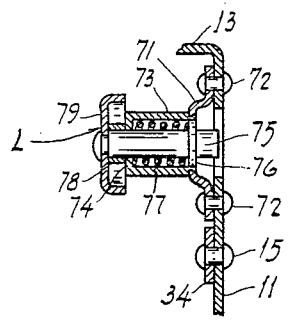
Fig. 10 is a sectional view of the restraining bar locking means taken along line 10—10 of Fig. 9.
Figure 9:
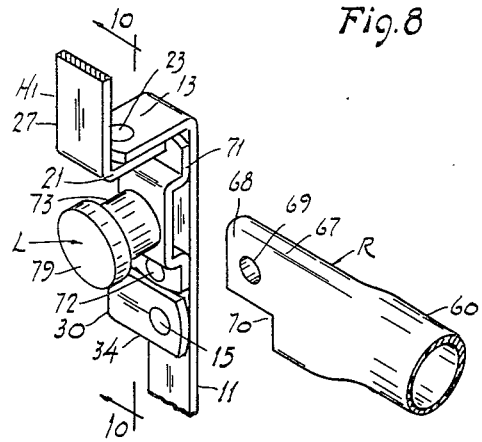
Fig. 9 is a fragmental sectional isometric view of the lock end of the auxiliary seat restraining bar.

The restraining bar R locking means L, as illustrated in Figs. 9 and 10, is comprised of a base member 71, fixedly attached to the back frame member 11 by rivets 72—72. A cylindrical body portion 73 with one closed end 74 is fixedly attached to the base member 71. Housed within the body portion 73 is a bolt 75; the bolt has a flange 76 formed adjacent to its inner end and between said flange 76 and the closed end 74 of the body portion is a helical spring 77. The spring 77 tends to hold and retain the bolt 75 within the hole 69 in the flattened left hand end 67 of the restraining bar R when the restraining bar is in the locked position. The bolt is limited in its inward travel by the collar 78 positioned between the bolt operating knob 79 and the closed end 74 of the lock cylindrical body portion 73.

When a child is confined to a device of this kind it is advantageous to have incorporated in the device some form of amusement. In the auxiliary seat illustrated a replica of an automobile steering wheel 80 and gear shift lever 81 is illustrated. The steering wheel 80 is supported by a combination steering wheel support and seat support strap securing means 82 and is comprised of a tubular metal member flattened at both ends. One of the flattened ends 83 is bent and pierced with two holes for securing bolts 85; said securing bolts firmly affix the steering wheel support 82 to the front of the restraining bar R. A downwardly extending portion of the steering wheel support 82 has a rectangular hole 86 formed therein and arranged to secure the hook 52 on the front end of the seat support strap 50. The upper flattened end 84 of the steering wheel support 82 is pierced for a bolt combination 87 arranged to rotatably secure the steering wheel 80 and the gear shift lever 81. Stops 88—88 are formed on the underside of the flattened portion 84 of the steering wheel support member to limit the travel of the gear shift lever, see Fig. 7.

An alternate method of securing the seat support strap 50 is illustrated in Fig. 3. The securing means illustrated in Fig. 3 is used in place of the seat strap and steering wheel support 82 when the steering wheel is not a part of the combination. The seat support strap securing means is comprised of a flat plate 82A that is secured to the front of the restraining bar R by the bolts 87A, see Fig. 5. A rectangular hole 86A through the lower portion of the plate 82A is arranged to interfit with the spring hook 52 on the front end of the seat support strap 50.

Although my invention has been described in considerable detail, such description is intended as illustrative rather than as limiting, as the invention may be variously embodied, and the scope of the invention is to be determined as claimed.

I claim as my invention:

1. A foldable auxiliary seat adapted for attachment to the back of a chair, said auxiliary seat comprising a back member, a movable seat member movably attached to said back member, a child restraining bar movably attached to one side of said back member and detachably attached to the other side of said back member, said detachable attachment of said restraining bar permitting lateral movement of said restraining bar for the placement or removal of the child into and out of the confines of said auxiliary seat, said back member being of metal having outwardly extending upper portions, vertical pivots therethrough, attachment hooks mounted upon the pivots, a recess at one side of the back member and a U-shapeed member vertically pivoted in said recess, and one end of said restraining bar attached to said U-shaped member, a seat supporting strap detachably connected to said restraining bar and said back and being adapted to serve as a seat per se whereby said seat can be dropped beneath said supporting strap.

2. A baby car seat comprising a seat portion and a back portion, a pair of hooks attached to said back portion, said seat portion being pivotally connected to said back portion whereby said seat portion may be swung from a horizontal position perpendicularly to said back portion to a vertical position in substantially the same vertical plane as said back portion, a guard rail extending outwardly from said back portion, said guard rail being pivotally mounted to be moved from a horizontal position to a vertical position, and a support strap which has one end attached to said back portion and which is placed under the seat portion and its free end detachably attached to the front of said guard rail whereby said seat portion is held in a horizontal position, said support strap being adapted to be positioned between said back portion and above said seat portion whereby said seat portion will move to a vertical position and whereby the child can stand on the automobile car seat with its legs positioned on opposite sides of said support strap when the front end of said support strap is attached to said guard rail.

3. The invention of claim 2, wherein said back portion and said seat portion are spaced apart and said seat strap can be shifted to lie beneath the said seat portion and be attached to the guard rail to sustain said car seat in a horizontal position.

References Cited in the file of this patent

UNITED STATES PATENTS

| | | |
|---|---|---|
| D. 167,287 | Smith | July 15, 1952 |
| 2,349,092 | Hammer | May 16, 1944 |
| 2,450,301 | Quiggle | Sept. 28, 1948 |
| 2,533,527 | Soltis | Dec. 12, 1950 |
| 2,723,709 | Welsh | Nov. 15, 1955 |